United States Patent
Co et al.

(10) Patent No.: US 11,727,491 B2
(45) Date of Patent: *Aug. 15, 2023

(54) LISTED OPTIONS POSITION COMPRESSION SYSTEM

(71) Applicant: Chicago Mercantile Exchange Inc., Chicago, IL (US)

(72) Inventors: Richard Co, Chicago, IL (US); Dhiraj Subhash Bawadhankar, Naperville, IL (US); Florian Huchedé, Chicago, IL (US); John Balaam Alexander Kerpel, Chicago, IL (US); Andrey Lopatin, Lisle, IL (US); Romil Pradip Parekh, Northbrook, IL (US); Robert William Taylor, Mount Prospect, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,621

(22) Filed: Oct. 10, 2022

(65) Prior Publication Data

US 2023/0030726 A1    Feb. 2, 2023

Related U.S. Application Data

(63) Continuation of application No. 17/357,324, filed on Jun. 24, 2021, now Pat. No. 11,488,246, which is a (Continued)

(51) Int. Cl.
*G06Q 40/04* (2012.01)
*G06Q 10/04* (2023.01)
*G06Q 40/06* (2012.01)

(52) U.S. Cl.
CPC ............ *G06Q 40/04* (2013.01); *G06Q 10/04* (2013.01); *G06Q 40/06* (2013.01)

(58) Field of Classification Search
CPC ..................................................... G06Q 40/04
See application file for complete search history.

(56) References Cited

U.S. PATENT DOCUMENTS

| 6,016,483 A * | 1/2000 | Rickard | G06Q 40/00 |
| | | | 705/36 R |
| 8,676,690 B1 * | 3/2014 | Sprague | G06Q 40/06 |
| | | | 705/36 R |

(Continued)

FOREIGN PATENT DOCUMENTS

| AU | 740917 B2 * | 11/2001 | ............ G06Q 40/06 |
| AU | 740917 B2 | 11/2001 | |

OTHER PUBLICATIONS

Interest Rate Swaps Compression: A Progress Report, Feb. 2012, ISDA, whole document (Year: 2012).*

(Continued)

*Primary Examiner* — Hani M Kazimi
*Assistant Examiner* — Adam Hilmantel
(74) *Attorney, Agent, or Firm* — Lempia Summerfield Katz LLC

(57) ABSTRACT

Systems are provided for compressing portfolios of open option positions. Market participants may provide constraints, such as net delta and gamma values within a specific tolerance. A compression engine uses a linear, integer and/or linear-quadratic programming solver to analyze portfolios of multiple market participants and identify multilateral option spread trades that result in portfolios that are compressed subject to the constraints.

22 Claims, 5 Drawing Sheets

Related U.S. Application Data continuation of application No. 15/812,573, filed on Nov. 14, 2017, now Pat. No. 11,080,785.

(56) References Cited

U.S. PATENT DOCUMENTS

| | | | | |
|---|---|---|---|---|
| 2001/0014875 A1* | 8/2001 | Young | ............ | G06Q 40/00 705/37 |
| 2005/0187844 A1* | 8/2005 | Chalermkraivuth | ............ | G06Q 10/06375 705/36 R |
| 2008/0183615 A1* | 7/2008 | Rio | ............ | G06Q 40/04 705/37 |
| 2010/0017323 A1* | 1/2010 | Zimmerman | ............ | G06Q 40/04 705/37 |
| 2012/0054082 A1* | 3/2012 | Al-Saadi | ............ | G06Q 40/04 705/37 |
| 2014/0095377 A1 | 4/2014 | Kalt | | |

OTHER PUBLICATIONS

"Dokuchaev and Haussmann, Optimal portfolio selection and compression in an incomplete market, Quantitative Finance, vol. 1 (2001), whole document" (Year: 2001).*

"Interest Rate Swaps Compression: A Progress Report", ISDA Study, Feb. 2012, 9 pages.

* cited by examiner

| Instrument | A | B | C | D |
|---|---|---|---|---|
| 1 | -1 | -1 | 1 | -1 |
| 2 | -1 | -1 | -1 | -1 |
| 3 | -1 | -1 | 1 | 1 |
| 4 | 1 | -1 | -1 | 1 |
| 5 | -1 | 1 | -1 | -1 |
| 6 | -1 | 1 | 1 | 1 |
| 7 | -1 | 1 | 1 | 1 |
| 8 | 1 | 1 | -1 | -1 |
| 9 | -1 | -1 | -1 | 1 |
| 10 | 1 | -1 | -1 | 1 |

Figure 5

LISTED OPTIONS POSITION COMPRESSION SYSTEM

REFERENCE TO RELATED APPLICATIONS

This application is a continuation under 37 C.F.R. § 1.53(b) of U.S. patent application Ser. No. 17/357,324 filed Jun. 24, 2021, now U.S. Pat. No. 11,488,246, which is a continuation under 37 C.F.R. § 1.53(b) of U.S. patent application Ser. No. 15/812,573 filed Nov. 14, 2017, now U.S. Pat. No. 11,080,785, the entirety of all of which are incorporated by reference herein and relied upon.

FIELD OF THE INVENTION

The present invention relates to computer systems and methods for processing financial instruments, in particular, to computer systems and methods that allow for more efficient processing of portfolios by simultaneously compressing the portfolios of multiple counterparties.

DESCRIPTION OF RELATED ART

Computer systems and networks are frequently used to trade securities and derivatives. Futures and options contracts are exemplary financial instruments frequently traded via computer systems and methods. A futures contract is an agreement to buy or sell a particular commodity or financial instrument at a strike price at a specified time in the future. Futures contracts are standardized to facilitate trading at exchanges. An option contract may be used to hedge risks by allowing parties to agree on a price for a purchase or sale of another instrument that will take place at a later time. One type of option is a call option. A call option gives the purchaser of the option the right, but not the obligation, to buy a particular asset either at or before a specified later time at a guaranteed price. The guaranteed price is sometimes referred to as the strike or exercise price. Another type of option is a put option. A put option gives the purchaser of the option the right, but not the obligation, to sell a particular asset at a later time at the strike price. In either instance, the seller of the call or put option can be obligated to perform the associated transactions if the purchaser chooses to exercise its option or upon the expiration of the option.

Traders of options often use models that determine risks for portfolios of options. The models often produce values that reflect an option's sensitivity to changes in predefined variables. These predefined variables are assigned Greek letters, such as delta, gamma, theta, and kappa. Kappa is sometimes referred to as vega or tau. Delta is a measure of the rate of change in a derivative's theoretical value for a one-unit change in the price of the option's underlying contract. Thus, delta is the theoretical amount by which the derivative price can be expected to change for a change in the price of the underlying contract. As such, delta provides a local measure of the equivalent position risk of an option position with respect to a position in the underlying contract. A "50 Delta" option should change its price 50/100, or ½ a point, for a one point move in its underlying contract.

Gamma is a measure of the rate of change in an option's delta for a one-unit change in the price of the underlying contract. Gamma expresses how much the option's delta should theoretically change for a one-unit change in the price of the underlying contract. Theta is a measure of the rate of change in an option's theoretical value for a one-unit change in time to the option's expiration date. Vega is a measure of the rate of change in an option's theoretical value for a one-unit change in the (implied) volatility of the underlying contract. Delta, gamma, and vega are the primary measures used by those who trade in options.

When adjusting portfolios to obtain desired levels of delta, gamma, theta and/or kappa, traders often purchase additional options that result in the adjustments. In other words, traders are often more concerned with levels of delta, gamma, theta and/or kappa than they are with the number of options that comprise a portfolio. This practice has resulted in strain on the computer system used to process and trade financial instruments. An increase in the number of financial instruments that are processed or traded by the computer systems consumes more bandwidth and processing resources and generally degrades the performance of the computer systems. Moreover, regulations may require an increase in margin or capital requirements for portfolios with more open positions even when a risk profile for the portfolio does not change.

Therefore, there is a need in the art for more efficient systems and methods for processing and trading financial instruments that minimize the number of open positions while maintaining a desired risk profile.

SUMMARY OF THE INVENTION

Embodiments of the present invention overcome problems and limitations of the prior art by providing efficient systems and methods for processing and trading financial instruments, such as futures and options, that minimize the number of open positions while maintaining a desired risk profile of the portfolio. Market participants may provide constraints, such as net delta and gamma values within a specific tolerance. A compression engine uses a linear, integer and/or linear-quadratic programming solver to analyze portfolios of multiple market participants and identify multilateral option spread trades that result in portfolios that are compressed subject to the constraints.

In other embodiments, embodiments of the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIG. 5 shows the signs of the orders illustrated in FIG. 4.

DETAILED DESCRIPTION OF THE INVENTION

Figure 1:
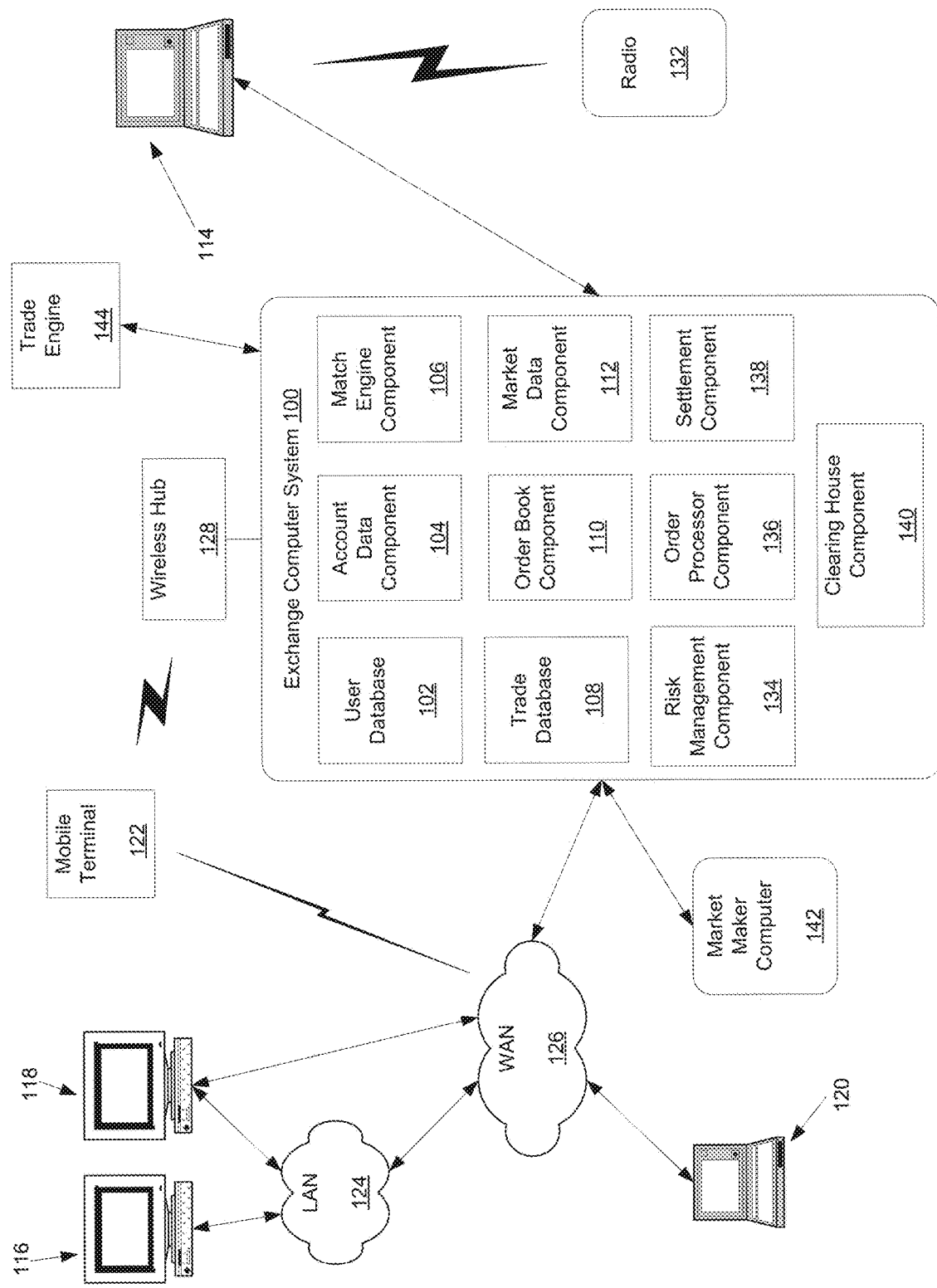
FIG. 1 shows a computer network system that may be used to implement aspects of the present invention.

Aspects of the present invention may be implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop, or other computers. A user database 102 includes information identifying traders and other users of exchange computer system 100. Data may include usernames and passwords potentially with other information to identify users uniquely or collectively. An account data component 104 may process account information that may be used during trades. A match engine component 106 is included to match bid and offer prices. Match engine component 106 may be implemented with hardware and software that executes one or more algorithms for matching bids and offers. Match engines may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may cause existing match engines to increase the response time or latency experienced by market participants.

A trade database 108 may be included to store information identifying trades and descriptions of trades. In particular, a trade database may store information identifying the time that a trade took place and the contract price. An order book component 110 may be included to compute or otherwise determine current bid and offer prices. A market data component 112 may be included to collect market data, e.g., data regarding current bids and offers for futures contracts, futures contract options and other derivative products. Market data component 112 may also prepare the data for transmission to users.

A risk management component 134 may be included to compute and determine a user's risk utilization in relation to the user's defined risk thresholds. An order processor component 136 may be included to decompose orders, such as orders for variable defined derivative products, and/or aggregate order types for processing by order book component 110 and match engine component 106.

A settlement component 138 may be included to provide one or more functions related to settling or otherwise administering transactions cleared by an exchange or other trading entity. Settlement component 138 of the exchange computer system 100 may be configured to use one or more settlement price determination techniques. Settlement-related functions need not be limited to actions or events occurring at the end of a contract term. For instance, in some embodiments, settlement-related functions may include or involve daily or other mark-to-market settlements for margining purposes. In some cases, settlement component 138 may be configured to communicate with the trade database 108 and/or to determine a payment amount based on a spot price, the price of the futures contract or other financial instrument, or other price data, at various times. The determination may be made at one or more points in time during the term of the financial instrument in connection with a margining mechanism. For example, the settlement component 138 may be used to determine a mark-to-market amount on a daily basis during the term of the financial instrument. Such determinations may also be made on a settlement date for the financial instrument for the purposes of final settlement.

A clearing house component 140 may be included as part of exchange computer system 100 and configured to carry out operations of a clearing house of the exchange that operates exchange computer system 100. Clearing house component 140 may receive data from and/or transmit data to trade database 108 and/or other components of exchange computer system 100 regarding trades of futures contracts, futures contracts options, and other financial products traded through the exchange that operates exchange computer system 100. Clearing house component 140 may facilitate the financial product exchange (or a clearing house of the exchange) acting as one of the parties to every traded contract or other product. For example, computer system 100 may match an offer by Party A to sell a futures contract, an option, or another exchange-traded financial product with a bid by Party B to purchase a like exchange-traded financial product. Clearing house component 140 may then create an exchange-traded financial product between Party A and the exchange clearing house and a second exchange-traded financial product between the exchange clearing house and Party B. Clearing house component 140 similarly creates offsetting contracts when creating contracts as a result of an option exercise and/or may select option grantors to fulfill obligations of exercising option holders. Clearing house component 140 may also be configured to perform other clearing house operations. As a further example, clearing house component 140 may maintain margin data with regard to clearing members and/or trading customers. As part of such margin-related operations, clearing house component 140 may store and maintain data regarding the values of various options, futures contracts and other interests, determine mark-to-market and final settlement amounts, confirm receipt and/or payment of amounts due from margin accounts, confirm satisfaction of delivery and other final settlement obligations, etc.

Each of the components shown as part of exchange computer system 100 may be implemented with one or more processors configured to execute computer-executable instructions for carrying out the functions described above. Those instructions may be stored in a memory located at the component or elsewhere. For example, match engine component 106 may be implemented with one or more processors programmed with computer-executable instructions, stored in a memory located at component 106 or elsewhere, for matching bids and offers. Some of the components shown as part of exchange computer system 100 may share one or more processors or processing cores. The components shown may also be implemented with separate processors or processing cores of computing devices or hardware components connected in a networked computer system. Databases 102 and 108 may be implemented with memory devices that store organized collections of data. In some embodiments concurrent processing limits may be defined by or imposed separately or in combination on one or more of the components or databases of exchange computer system 100.

In some embodiments, one or more of the components of exchange computer system 100 may be integrated to any desired extent. For example, the settlement component 138 and the risk management component 134 may be integrated to any desired extent. In some cases, one or more margining procedures or other aspects of the margining mechanism(s) may be implemented by settlement component 138.

The trading network environment shown in FIG. 1 includes computer devices 114, 116, 118, 120 and 122. Each computer device includes a central processor that controls the overall operation of the computer and a system bus that connects the central processor to one or more conventional components, such as a network card. Each computer device may also include a variety of interface units and drives for reading and writing data or files. Depending on the type of computer device, a user can interact with the computer with a keyboard, pointing device, microphone, pen device or other input device.

Exchange computer system 100 may also communicate in a variety of ways with devices that may be logically distinct from computer system 100. For example, computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via T1 lines or other wired or wireless communication paths. Alternatively, a mobile terminal 122, which may be implemented with a mobile phone, may communicate with LAN 124 or a wide area network (WAN) 126, such as the Internet, via radio waves. Mobile terminal 122 may also communicate with exchange computer system 100 via a conventional wireless hub 128. FIG. 1 also shows LAN 124 connected to WAN 126. LAN 124 may include a router to connect LAN 124 to WAN 126. Computer device 120 is shown connected directly to WAN 126. The connection may be via a network interface card or any other device for connecting a computer device to a network.

One or more market participant computers 142 may maintain one or more markets by providing bid and offer prices for derivatives or securities to exchange computer system 100. Exchange computer system 100 may also exchange information with other trade engines, such as trade engine 144. One skilled in the art will appreciate that numerous additional computers and systems may be coupled to exchange computer system 100. Such computers and systems may include clearing, regulatory and fee systems. Coupling can be direct as described or any other method described herein.

The operations of computer devices and systems shown in FIG. 1 may be controlled by computer-executable instructions stored on a computer-readable medium. Various computer-readable media that are tangible and non-transitory may be used. In one example, the computer device 116 may include computer-executable instructions for receiving order information from a user and transmitting that order information to exchange computer system 100. In another example, the computer device 118 may include computer-executable instructions for receiving market data from the exchange computer system 100 and displaying that information to a user.

Of course, numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may be connected by numerous alternative topologies.

Embodiments of the invention use clearing houses to withhold tax payments for constructive dividend payments. Typically, an exchange or other trading entity provides a "clearing house" which is a division of the exchange through which all trades made must be confirmed, matched, and settled each day until offset or delivered. The clearing house may be an adjunct to the exchange responsible for settling trading accounts, clearing trades, collecting, and maintaining performance bond funds, regulating delivery and reporting trading data. Clearing is the procedure through which the clearing house becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the clearing house.

As an intermediary, an exchange bears a certain amount of risk in each transaction that takes place, i.e., the exchange assumes counterparty credit risks in each transaction by inserting its clearing house as the counterparty to both sides of the transaction. To that end, risk management mechanisms protect the exchange via the clearing house. The clearing house establishes clearing level performance bonds (margins) for all exchange products and establishes minimum performance bond requirements for customers of exchange products. A performance bond, also referred to as a margin, is the funds that must be deposited by a customer with his or her broker, by a broker with a clearing member or by a clearing member with the clearing house, for the purpose of insuring the opposing clearing broker, its customer or clearing house against loss on open futures or options contracts. This is not a part payment on a purchase. The performance bond helps to ensure the financial integrity of brokers, clearing members and the exchange as a whole. The performance bond to clearing house refers to the minimum dollar deposit which is required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Accounts of individual members, clearing firms and non-member customers doing business through an exchange are generally carried and guaranteed to the clearing house by a clearing member. As mentioned above, in every matched transaction executed through the exchange's facilities, the clearing house is substituted as the buyer to the seller and the seller to the buyer, with a clearing member assuming the opposite side of each transaction. The clearing house may be an operating division of the exchange, and all rights, obligations and/or liabilities of the clearing house may be rights, obligations and/or liabilities of the exchange. Clearing members assume full financial and performance responsibility for all transactions executed through them and all positions they carry. The clearing house, dealing exclusively with clearing members, holds each clearing member accountable for every position it carries regardless of whether the position is being carried for the account of an individual member, for the account of a non-member customer, or for the clearing member's own account. Conversely, as the contra-side to every position, the clearing house is held accountable to the clearing members for the net settlement from all transactions on which it has been substituted as provided in clearing house rules.

Figure 2:
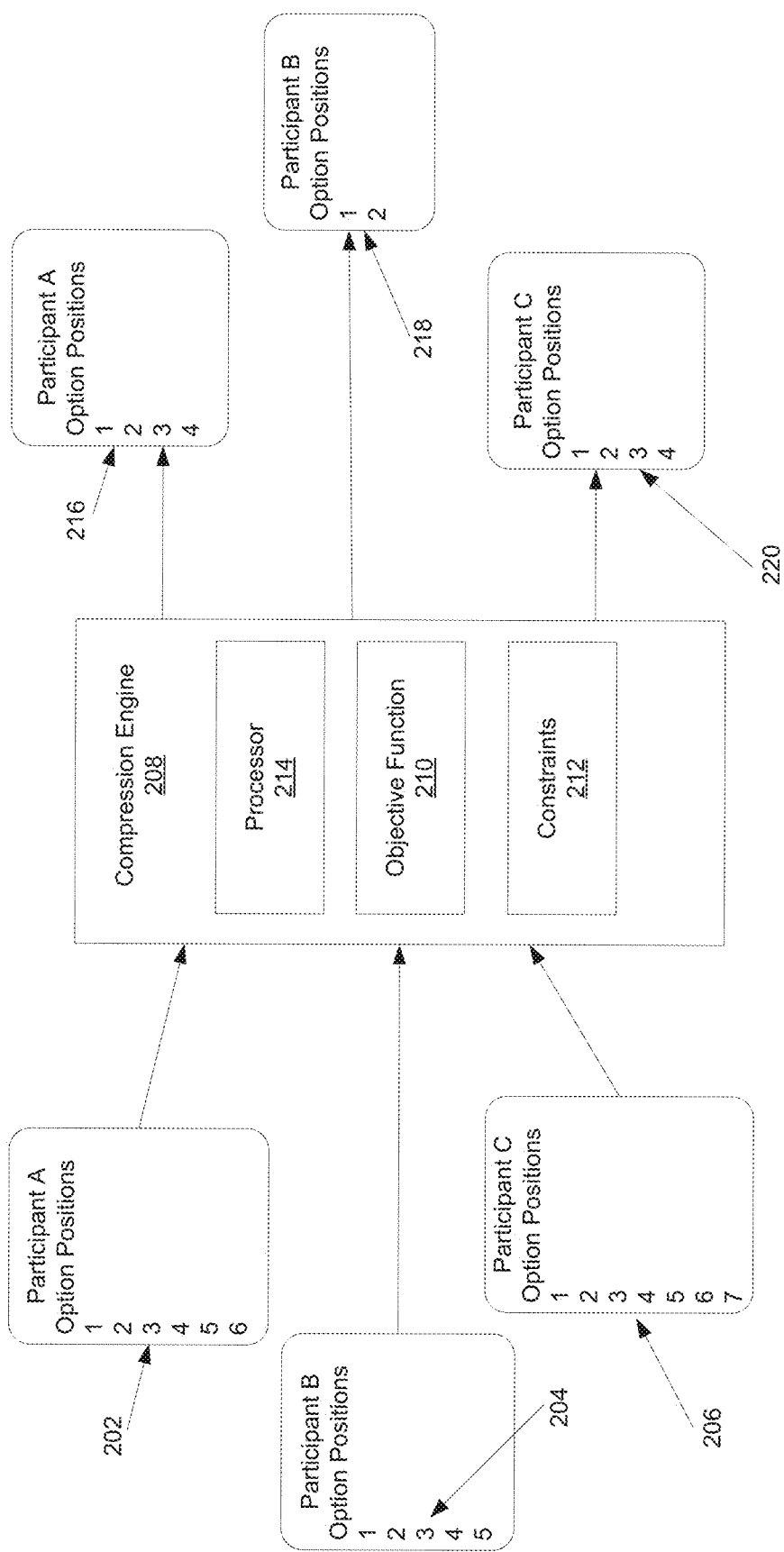
FIG. 2 illustrates a system for compressing open option positions in accordance with an embodiment of the invention.

FIG. 2 illustrates a system for compressing open option positions in accordance with an embodiment of the invention. Market Participants A, B and C include open option positions 202, 204 and 206, respectively. In the example shown Participant A has 6 open options positions, Participant B has 5 open option positions and Participant C has 7 open option positions. The numbers of participants and positions were chosen for illustration purposes only. Of course, many more participants and positions may be used. As described in more detail below, the open option position information may include strike prices, settlement prices and risk parameters such as delta and gamma values for each option.

The open option positions are transmitted to a compression engine 208. Compression engine 208 may use a linear, integer and/or linear-quadratic programming solver. Such problem solvers are available commercially as open source software and try to minimize or optimize an objective function 210 subject to defined constraints 212. The objective function may determine the number of multilateral option spread trades used to compress open option positions. Exemplary constraints include maintaining net delta and gamma values within a specific tolerance for each market participant. A processor 214 may be programmed with computer executable instructions to implement a linear, integer and/or linear-quadratic programming solver. After processing by compression engine 208, Participants A, B and C have reduced open option positions 216, 218 and 220, respectively.

Figure 3:
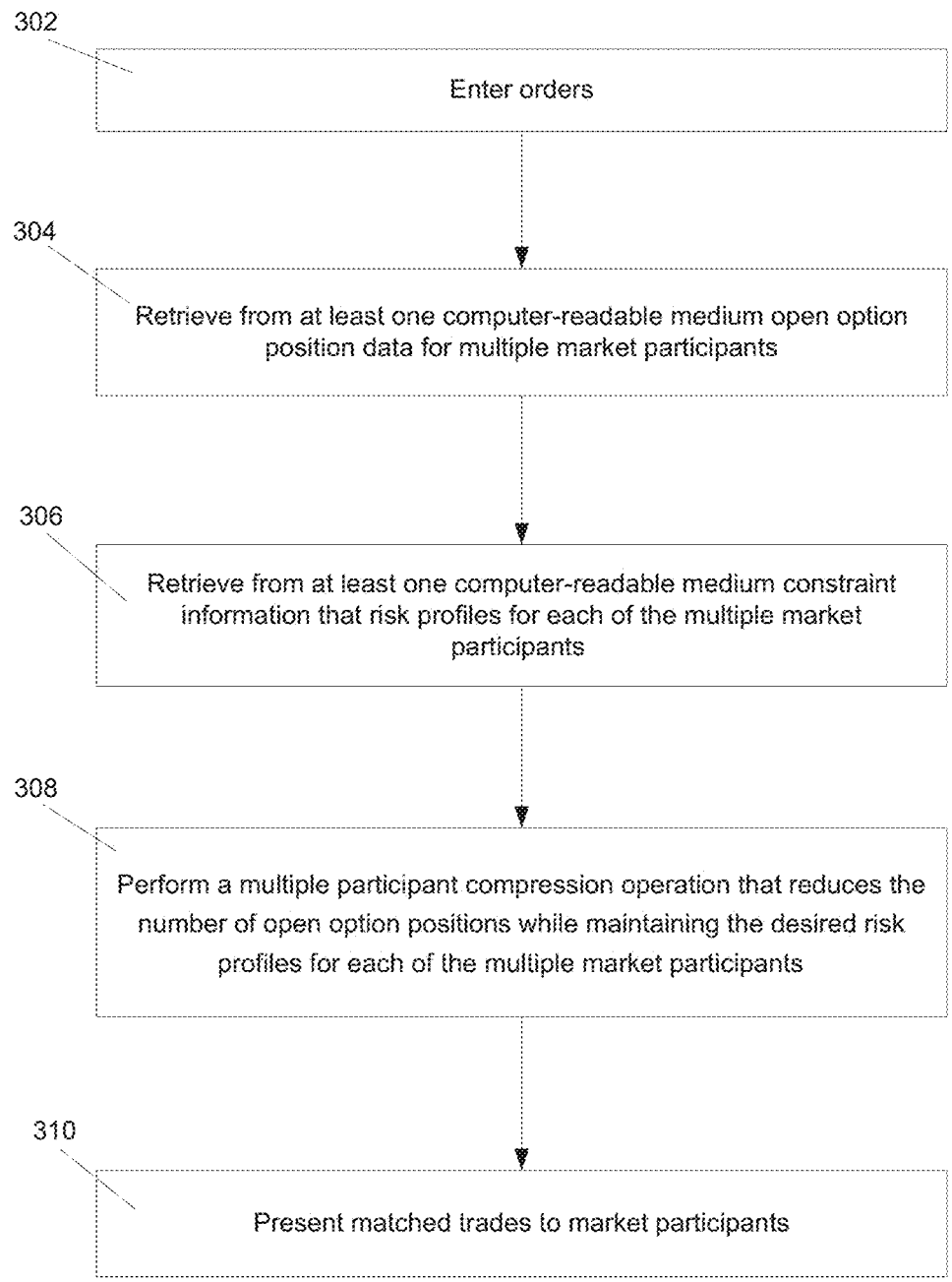
FIG. 3 illustrates a process for compressing open option positions in accordance with an embodiment of the invention.

FIG. 3 illustrates a process for compressing open option positions in accordance with an embodiment of the invention. In step 302, orders are entered. The orders correspond to open option positions that will be considered for compression. Step 302 may be performed manually by market participants or may involve downloading data directly from an exchange computer system or other computer. The order entry process may involve entering constraints, such deviation tolerances for delta or any of the other constraints described herein. In some embodiments the entered data is validated before subsequent processing.

Figure 4:
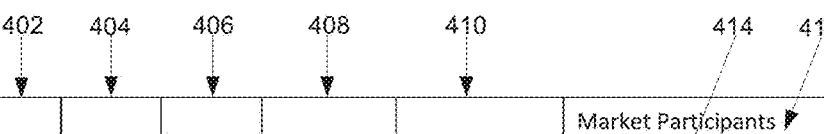
FIG. 4 shows exemplary order information that corresponds to open option positions for multiple market participants.

FIG. 4 shows exemplary order information that corresponds to open option positions for market Participants A, B, C and D. Each row represents a different option position. The identification of the option as a put or call, strike price, settle price and option delta are in columns 402, 404, 406 and 408 respectively. An instrument number for each of the open option positions is included in column 410. Section 412 includes columns listing each market participant and a number of contracts. Box 414, for example, indicates that market Participant A's order includes selling 39 contracts of instrument #1. A negative sign indicates that the market participant has a long position and would sell to compress the portfolio. A positive sign indicates that the market participant has a short position and would buy to compress the portfolio. Zero indicates that the market participant has no open position for that contract. The signs of the orders are illustrated in FIG. 5.

Returning to FIG. 3, in step 304, a computer device retrieves open option position data for multiple market participants. Step 304 may be performed by a compression engine, an exchange computer system or another computer device and may include retrieving information, such as the information shown in FIG. 4, from a computer-readable medium. In step 306 a computer device retrieves risk profiles for each of the multiple market participants. Step 306 may also be performed by a compression engine, exchange computer system or another computer device and may include retrieving deviation tolerances for net delta, gamma and/or other risk parameters from a computer-readable medium.

Next, in step 308 a multiple participant compression operation is performed that reduces the number of open option positions while maintaining the desired risk profiles for each of the multiple market participants. Step 308 may be performed by a linear, integer and/or linear-quadratic programming solver.

An exemplary process for reducing the number of open option positions while maintaining the desired risk profiles is shown below using the data shown in FIGS. 4 and 5.

a. Denote the matrix of participants and orders in FIG. 4 as $\{Q_{i,j}\}$.

b. Denote the "fills" in the trade matching as $\{F_{i,j}\}$, where i ranges over the list of instruments and j ranges over the list of participants.

c. Further, denote as $\{S_{i,j}\}$ the sign of the orders shown in FIG. 5 (i.e., sell orders are −1 and buys are +1; for zero quantity, either value is fine).

$$S_{i,j}=\text{sgn}(Q_{i,j})$$

d. Further, denote the delta and gamma for each instrument as $\Delta_i$ and $\gamma_1$.

The objective function is defined as:

$$L=\tfrac{1}{2}\Sigma_{i,j}S_{i,j}\times F_{i,j} \text{ (i.e., number of total fills)},$$

Subject to constraints:
1. $\forall i,j$: $S_{i,j}F_{i,j}\geq 0$, (i.e., no wrong way trades)
2. $\forall i,j$: $S_{i,j}Q_{i,j}\geq S_{i,j}F_{i,j}$, (i.e., no overfills)
3. $\forall i$: $\Sigma_j F_{i,j}=0$, (i.e., number of contracts bought and sold are equal)
4. $\forall j$: $-\text{Dtol}_j\leq \Sigma_i F_{i,j}\times \Delta_i \leq \text{Dtol}_j$ (i.e., net delta for Participant j within tolerance specified)
5. $\forall j$: $-\text{Gtol}_j\leq \Sigma_i F_{i,j}\times \gamma_i \leq \text{Gtol}_j$ (i.e., net gamma for Participant j within tolerance specified)

The objective function and all the constraints are linear in the variable $F_{i,j}$ and, as such, commercially available programming packages can be used for solving the problem of maximizing the objective function subject to the identified constraints.

Finally, in step 310 matched trades are presented to market participants. The matched trades result in the compression of open option positions. Step 310 may include providing trade confirmations to market participants. Alternatively, step 310 may include providing compressed portfolios to users.

The resulting compressed portfolios allow for more efficient processing of the portfolios by computer devices. Exchange computer systems and other computer systems have reduced processing requirements to process data associated with the compressed portfolio. Compressed portfolios result in lower bandwidth requirements to process the portfolios and perform tasks such as distributing market data. Compressed portfolios also contain fewer open contracts and thus potentially reduces capital requirements dictated by prudential regulators for backstopping the risk posed by the portfolio.

Various embodiments may include additional or alternative constraints. Some of the constraints may be imposed by an exchange or other entity that performs portfolio compression or may be selected by market participants. Some embodiments may provide incentive to market participants to agree to constraints that provide for a more efficient compression process or allow an exchange or other entity to process portfolios more efficiently after the compression.

In some embodiments, a list of instruments, such as the one shown in FIG. 4 may be augmented by the underlying E-mini S&P futures (i.e., the 1-delta instrument) to make the delta balancing easier to accomplish. In this embodiment, constraints 1 or 2 may be eliminated because the process would not involve constraining the direction or size of the trade for the futures wildcard. The list of instruments can further be augmented by the at-the-money option (e.g., the option with approximately the largest gamma) to make the gamma constraints easier to meet. This embodiment may include removing constraints 1 and 2 for this instrument. The instrument may also be removed from the objective function so that the process does not try to maximize the wildcard volume.

Increased customization may also be used in some embodiments. For example, additional market participant inputs can be allowed: e.g., delta, gamma tolerance for each participant, as well as max quantity edits (i.e., adjusting $Q_{i,j}$) and desirability weights (i.e., redefining the objective function $L=1/2\Sigma_{i,j} A_{i,j} \times S_{i,j} \times F_{i,j}$, where participants specify relative desirability weights $A_{i,j}$ to favor matching certain strikes).

In yet other embodiments constraints 3 and 4 may be modified as a quadratic penalty and appended to the objective function, e.g., $-M \times$sum of squares of deltas of each participants' fills$-N \times$sum of squares of gammas of each participants' fills. M and N are positive numbers to be specified for the size of penalty in deviating from the risk neutrality. This embodiment will enable more flexibility in both the solver and/or the solution.

The compression process may also be modified by subdividing the problem into different strike/expiration buckets, and solutions run for each bucket separately, e.g., binning the strikes for S&P options with consecutive 200-point strike ranges for each expiration; with the strike at the center of each 200-point range as the free play for gamma. This modification may reproduce a resulting portfolio that would resemble the original portfolio in terms of instrument distribution—and thus risk characteristics of the resulting portfolios under different market environment post-match. The resulting portfolio may also have reduced legs and a notional value but are concentrated in this group of specially chosen strikes. Concentrating the positions into specific strikes may help increase the liquidity as there will be many participants with positions in a smaller number of instruments.

The order of the market participants may also be randomized before loading to ensure that a compression engine does not favor any market participant. The rate of performing the compression process may be chosen so that any advantage to one market participant from the performance of one compression process will be offset by advantages to others during the performance of other compression processes.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims. All are considered within the sphere, spirit, and scope of the invention.

What is claimed is:

1. A compression engine apparatus comprising:
a processor coupled with an exchange computer system configured to process open option positions;
a non-transitory memory coupled with the processor, the non-transitory memory storing computer-executable instructions that when executed by the compression engine apparatus, cause the processor to:
receive open option position data indicative of a plurality of open option positions for a plurality of portfolios and constraint information associated with each of the plurality of portfolios; and
perform a multiple portfolio compression operation that reduces a number of the plurality of open option positions via an analysis of the open option positions data for the plurality of portfolios and determination of one or more multilateral option spread trades that result in one or more of the plurality of open option positions being closed subject to the received constraint information, wherein subsequent to the multiple portfolio compression operation, a bandwidth and processing resources required by the exchange computer system to process the remaining open option positions is reduced.

2. The compression engine apparatus of claim 1, wherein the constraint information includes one or more desired risk profiles and wherein the computer-executable instructions are further executable by the compression engine apparatus to cause the processor to maintain the one or more desired risk profiles for each of the plurality of portfolios.

3. The compression engine apparatus of claim 2, wherein subsequent to the multiple portfolio compression operation, the desired risk profiles for each of the plurality of portfolios are maintained.

4. The compression engine apparatus of claim 1, wherein the multiple portfolio compression operation further comprises use of a linear algebra processing technique.

5. The compression engine apparatus of claim 4, wherein the linear algebra processing technique utilizes an objective function that minimizes the number of the plurality of open option positions subject to at least one constraint.

6. The compression engine apparatus of claim 5, wherein the at least one constraint includes maintenance of a net delta for one of the plurality of portfolios within a specific tolerance.

7. The compression engine apparatus of claim 6, wherein the net delta is selected by a market participant associated with the one of the plurality of portfolios.

8. The compression engine apparatus of claim 5, wherein the at least one constraint includes maintenance of a net gamma for the one of the plurality of portfolios within a specific tolerance.

9. The compression engine apparatus of claim 5, wherein the at least one constraint includes a purchase and a sale of a same number of contracts.

10. The compression engine apparatus of claim 5, wherein the at least one constraint includes maintenance of a net delta for each of the plurality of portfolios within a specific tolerance.

11. The compression engine apparatus of claim 1, wherein the multiple portfolio compression operation further comprises use of a linear-quadratic algebra processing technique.

12. The compression engine apparatus of claim 1, wherein the processor further validates the received constraint information.

13. A computer implemented method comprising:
receiving, by a processor coupled with an exchange computer system configured to process open option positions, open option position data indicative of a plurality of open option positions for a plurality of portfolios and constraint information associated with each of the plurality of portfolios; and
performing, by the processor, a multiple portfolio compression operation that reduces a number of the plurality of open option positions via an analysis of the open option positions data for the plurality of portfolios and determination of one or more multilateral option spread trades that result in one or more of the plurality of open option positions being closed subject to the received constraint information, wherein subsequent to the multiple portfolio compression operation, a bandwidth and processing resources required by the exchange computer system to process the remaining open option positions is reduced.

14. The computer implemented method of claim 13, wherein the constraint information includes one or more desired risk profiles and wherein the multiple compression operation further comprises maintaining the one or more desired risk profiles for each of the plurality of portfolios.

15. The computer implemented method of claim 14, wherein subsequent to the multiple portfolio compression operation, the desired risk profiles for each of the plurality of portfolios are maintained.

16. The computer implemented method of claim 13, wherein the multiple portfolio compression operation further comprises using a linear algebra processing technique subject to at least one constraint.

17. The computer implemented method of claim 16, wherein the at least one constraint includes maintaining a net delta for each of the plurality of portfolios within a specific tolerance.

18. The computer implemented method of claim 17, wherein the specific tolerance for each net delta for each of the plurality of portfolios is selected by each of a plurality of market participants associated with each of the plurality of portfolios.

19. The computer implemented method of claim 16, wherein the at least one constraint includes maintaining a net gamma for one of the plurality of portfolios within a specific tolerance.

20. The computer implemented method of claim 13, wherein the multiple portfolio compression operation further comprises using a linear-quadratic algebra processing technique.

21. The computer implemented method of claim 13, further comprising:
validating, by the processor, the received constraint information.

22. A non-transitory computer readable medium comprising computer executable code that, when executed by a processor, cause the processor to perform a plurality of operations including:
receiving open option position data indicative of a plurality of open option positions for a plurality of portfolios and constraint information associated with each of the plurality of portfolios; and
performing a multiple portfolio compression operation that reduces a number of the plurality of open option positions via an analysis of the open option positions data for the plurality of portfolios and determination of one or more multilateral option spread trades that result in one or more of the plurality of open option positions being subject to the received constraint information, wherein subsequent to the multiple portfolio compression operation, a bandwidth and processing resources required to process the remaining open option positions is reduced.

* * * * *